UNITED STATES PATENT OFFICE.

HERMANN GUSSMANN, OF HÖCHST-ON-THE-MAIN, GERMANY, ASSIGNOR TO THE FARBWERKE, VORMALS MEISTER, LUCIUS & BRÜNING, OF SAME PLACE.

BLUE COTTON SULFUR DYE AND PROCESS OF MAKING SAME.

SPECIFICATION forming part of Letters Patent No. 657,769, dated September 11, 1900.

Original application filed June 3, 1899, Serial No. 719,292. Divided and this application filed November 7, 1899. Serial No. 736,083. (No specimens.)

*To all whom it may concern:*

Be it known that I, HERMANN GUSSMANN, Ph. D., a citizen of the Empire of Germany, residing at Höchst-on-the-Main, Germany, have invented certain new and useful Improvements in the Manufacture of a Blue Sulfurized Dyestuff from Oxynitro or Oxy-amido Diphenylaminsulfonic Acid, of which the following is a specification.

I have shown in a previous application, Serial No. 719,292, filed June 3, 1899, that dioxyamidodiphenylamin of the formula

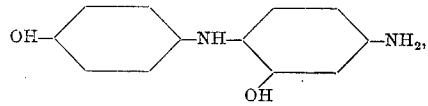

obtained by heating p-oxy-p-amido-diphenyl-aminsulfonic acid

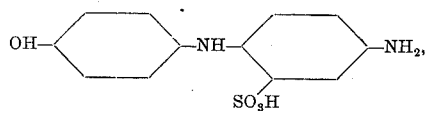

yields when heated with sulfur and sulfids of alkali metals a blue directly-dyeing dyestuff. I now have found that a yet more valuable blue dyestuff may be obtained if instead of dioxydiphenylamin oxynitro or oxyamidodiphenylaminsulfonic acid be directly heated with sulfur and sulfids of alkali metals. The nitro group is thus transformed into the $NH_2$ group.

Example: Into a molten mixture of one hundred parts, by weight, of sodium sulfid and thirty parts, by weight, of sulfur are introduced thirty parts, by weight, of oxyamidodiphenylaminsulfonic acid at about 130° centigrade and heated to from 160° to 180° centigrade till an evolution of hydrogen sulfid no longer takes place and the mass begins to thicken. The mass is then dissolved in water, and the liquid containing the dyestuff in form of its leuco compound is oxidized by introducing a current of air. After oxidation it is filtered from the separated sulfur and the dyestuff is precipitated from its aqueous solution by adding common salt. The dry dyestuff thus obtained is when pulverized a dark powder of coppery luster easily soluble in water with a blue color. Mineral acids precipitate the dyestuff from its aqueous solution as blue flakes. In sulfuric acid the dyestuff dissolves with a blue-green color.

Having now described my invention, what I claim is—

1. The herein-described process of producing a blue cotton dyestuff, which consists in heating para-oxy-para-amido-diphenylaminsulfonic acid to from 160° to 200° centigrade with sulfur and sulfids of alkali metals and then treating the mass thus obtained in an aqueous solution with oxidizing agents, substantially as set forth.

2. As a new product, the herein-described dyestuff derived from diphenylaminsulfonic acid and sulfur, said dyestuff being when pulverized a dark powder of coppery luster, readily soluble in water with a blue color, mineral acids precipitating the dyestuff from its aqueous solutions in blue flakes, the dyestuff dissolving in sulfuric acid with a blue-green color, substantially as set forth.

In testimony that I claim the foregoing as my invention I have signed my name in presence of two subscribing witnesses.

HERMANN GUSSMANN.

Witnesses:
HEINRICH HAHN,
ALFRED BRISBOIS.